US012315021B1

(12) United States Patent
Rushforth et al.

(10) Patent No.: US 12,315,021 B1
(45) Date of Patent: May 27, 2025

(54) SYSTEMS AND METHODS FOR SUPPLY CHAIN DATA PROCESSING AND FLOW MODELING

(71) Applicant: Arizona Board of Regents acting for and on behalf of Northern Arizona University, Flagstaff, AZ (US)

(72) Inventors: Richard Rushforth, Flagstaff, AZ (US); Benjamin Ruddell, Flagstaff, AZ (US)

(73) Assignee: Arizona Board of Regents acting for and on behalf Northern Arizona University, Flagstaff, AZ (US)

( * ) Notice: Subject to any disclaimer, the term of this patent is extended or adjusted under 35 U.S.C. 154(b) by 359 days.

(21) Appl. No.: 17/809,962

(22) Filed: Jun. 30, 2022

Related U.S. Application Data

(60) Provisional application No. 63/364,547, filed on May 11, 2022, provisional application No. 63/202,947, filed on Jun. 30, 2021.

(51) Int. Cl.
*G06Q 50/06* (2024.01)
*G06Q 10/04* (2023.01)
*G06N 3/08* (2023.01)

(52) U.S. Cl.
CPC ............. *G06Q 50/06* (2013.01); *G06Q 10/04* (2013.01); *G06N 3/08* (2013.01)

(58) Field of Classification Search
CPC ........... G06Q 50/06; G06Q 10/04; G06N 3/08
See application file for complete search history.

(56) References Cited

U.S. PATENT DOCUMENTS

| | | | | |
|---|---|---|---|---|
| 9,134,453 B1* | 9/2015 | Simpson | ................. | E21B 43/26 |
| 11,146,066 B2* | 10/2021 | Metcalfe | ................... | H02J 3/18 |
| 11,150,015 B2* | 10/2021 | Spaander | ............... | F25J 1/0052 |
| 11,525,594 B1* | 12/2022 | Hinson | .................... | F24F 11/64 |
| 11,591,936 B2* | 2/2023 | Alabdulmohsen | ..... | G05B 17/02 |
| 11,616,389 B2* | 3/2023 | Froehner | .............. | G05B 19/042 |
| | | | | 700/295 |
| 11,689,154 B2* | 6/2023 | Shukla | ................... | G08B 21/18 |
| | | | | 702/3 |
| 11,841,986 B2* | 12/2023 | Marti | .................... | H04L 67/535 |

(Continued)

OTHER PUBLICATIONS

Gomez, et al., "Fragility of a multilayer network of intranational supply chains," Applied Network Science (2020) 5:71. pp. 1-21. https://doi.org/10.1007/s41109-020-00310-1.

(Continued)

*Primary Examiner* — Ramesh B Patel
(74) *Attorney, Agent, or Firm* — IPTechLaw

(57) ABSTRACT

Implementations of a method of calculating a county-level consumption of natural gas may include providing county-level natural gas production data for a plurality of counties to a database from a data repository; removing from an analysis, using a processor, all areas of a first county of the plurality of counties that do not include a natural gas utility; and using the processor, the database, and the county-level natural gas production data, executing a regression with at least two geographical characteristics of the first county to determine a natural gas consumption within the first county. The method may also include using the processor, repeating for each county of the plurality of counties to determine the natural gas consumption for each of the plurality of counties.

15 Claims, 8 Drawing Sheets

(56) References Cited

U.S. PATENT DOCUMENTS

| | | | | |
|---|---|---|---|---|
| 11,848,561 | B1* | 12/2023 | Naghib | H02J 3/466 |
| 11,979,697 | B2* | 5/2024 | Shao | H04Q 9/02 |
| 2009/0261689 | A1* | 10/2009 | Fang | H02K 53/00 |
| | | | | 310/329 |
| 2014/0191575 | A1* | 7/2014 | Gaucher | H02J 3/144 |
| | | | | 307/38 |
| 2016/0204609 | A1* | 7/2016 | Tyler | H02J 3/16 |
| | | | | 700/298 |
| 2018/0356149 | A1* | 12/2018 | Spaander | F25J 1/0214 |
| 2020/0342372 | A1 | 10/2020 | Ruddell et al. | |
| 2020/0342382 | A1* | 10/2020 | Dianov | G06Q 10/06 |
| 2020/0342465 | A1* | 10/2020 | Ruddell | G06F 16/13 |
| 2021/0062681 | A1* | 3/2021 | Alabdulmohsen | G05B 17/02 |
| 2021/0296897 | A1* | 9/2021 | Cruickshank, III | H02J 3/14 |
| 2021/0313832 | A1* | 10/2021 | Parchure | G01R 19/2513 |
| 2022/0286761 | A1* | 9/2022 | Shao | H04Q 9/00 |
| 2022/0375219 | A1* | 11/2022 | Gupta | G06F 30/18 |
| 2024/0212071 | A1* | 6/2024 | Musse | G06Q 50/06 |

OTHER PUBLICATIONS

Garcia, et al., "Performance of a Multi-layer Commodity Flow Network in the United States Under Disturbance," Springer Nature Switzerland AG 2020, Complex Networks 2019, SCI 882, pp. 645-655, 2020. https://doi.org/10.1007/978-3-030-36683-4_52.

Garcia, et al., "A Machine Learning Model of Virtual Water Networks over Time," Advances in Water Resources, https://doi.org/10.1016/j.advwatres.2020.103819.

Brinkman, "North American Renewable Integration Study," NREL, accessed as early as Apr. 9, 2024, https://www.nrel.gov/analysis/naris.html.

Ruddell, et al., "Ecohydrologic process networks: 1. Identification," Water Resources Research, vol. 45, W03419, pp. 1-22. DOI:10.1029/2008WR007279, 2009.

Rushforth, et al., "The vulnerability and resilience of a city's water footprint: The case of Flagstaff, Arizona, USA," Water Resour. Res., 52, 2698-2714, pp. 2698-2714, DOI:10.1002/2015WR018006.

New, et al., "Automatic Building Energy Model Creation (AutoBEM) for Urban-Scale Energy Modeling and Assessment of Value Propositions for Electric Utilities," Oak Ridge National Laboratory Report for US Dept. of Energy. pp. 1-5.

Rushforth, et al., "A spatially detailed blue water footprint of the United States economy," Hydrol. Earth Syst. Sci., 22, pp. 3007-3032, 2018, https://doi.org/10.5194/hess-22-3007-2018.

Richter, et al., "Water scarcity and fish imperilment driven by beef production," Nature Sustainability, pp. 1-10, http://www.nature.com/natsustain, https://doi.org/10.1038/s41893-020-0483-z.

* cited by examiner

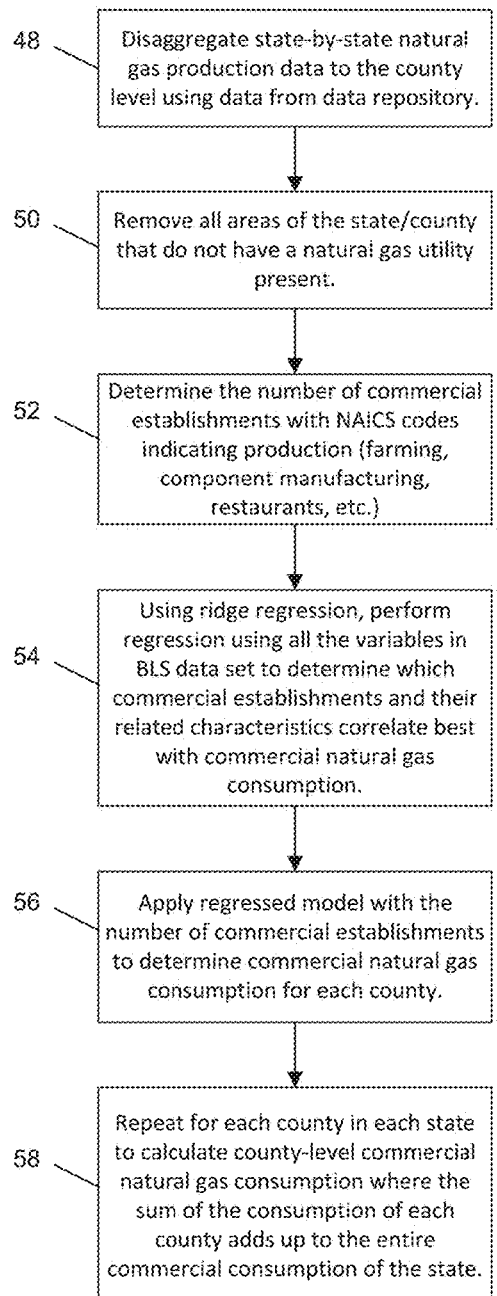
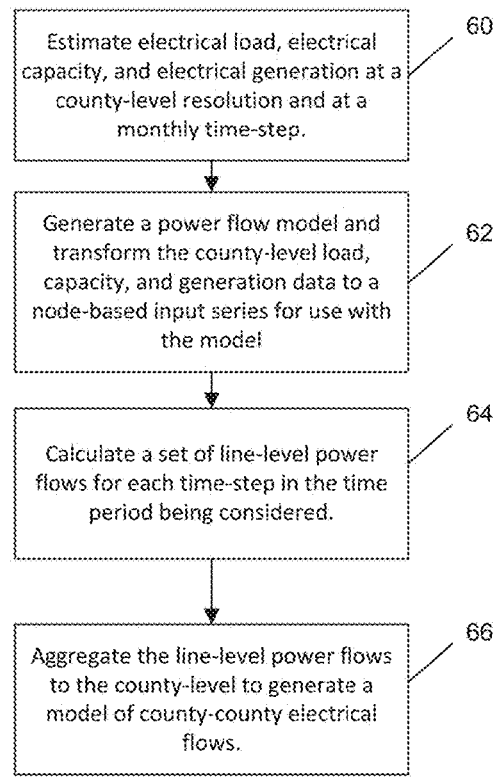
FIG. 4
FIG. 5

SYSTEMS AND METHODS FOR SUPPLY CHAIN DATA PROCESSING AND FLOW MODELING

CROSS REFERENCE TO RELATED APPLICATIONS

This document claims the benefit of the filing date of U.S. Provisional Patent Application 63/202,947 ('947 application), entitled "Systems and Methods For Supply Chain Data Processing and Flow Prediction" to Ruddell et al., which was filed on Jun. 30, 2021 and also claims the benefit of the filing date of U.S. Provisional Patent Application 63/364,547 ('547 application), entitled "Electricity and Natural Gas Flow Modeling Systems and Related Methods," to Rushforth et al, the disclosures of each of which are hereby incorporated entirely herein by reference.

BACKGROUND

1. Technical Field

Aspects of this document relate generally to systems and methods for analyzing flows of commodities. More specific implementations involve systems and methods for analyzing flows of natural gas, electricity, and other commodities.

2. Background

Commodities include items like electricity, natural gas, coal, foodstuffs, water, and other items used by people and animals in daily life and industry. Supply chains are used to outline the movement of commodities from place to place as they are used, consumed, or changed into other commodities.

SUMMARY

Implementations of a method of calculating a county-level consumption of natural gas may include providing county-level natural gas production data for a plurality of counties to a database from a data repository; removing from an analysis, using a processor, all areas of a first county of the plurality of counties that do not include a natural gas utility; and using the processor, the database, and the county-level natural gas production data, executing a regression with at least two geographical characteristics of the first county to determine a natural gas consumption within the first county. The method may also include using the processor, repeating for each county of the plurality of counties to determine the natural gas consumption for each of the plurality of counties.

Implementations of a method of calculating a county-level consumption of natural gas may include one, all, or any of the following:

The at least two geographical characteristics may be a population of a census block and an income level of residents of the census block, where the census block is located within the first county.

The natural gas consumption may be residential natural gas consumption.

The method may include: using the processor, determining whether a natural gas power facility may be present within the first county and crediting natural gas consumption of that natural gas power facility to the first county; and using the processor, determining a portion of a natural gas pipeline that passes through the first county and crediting natural gas consumption by the portion to the first county.

The at least two geographical characteristics may be a number of business establishments associated with North American Industry Classification System (NAICS) codes 11, 22, 31, and 33 and a total gross receipts of the number of business establishments where executing the regression further may include executing a ridge regression.

The natural gas consumption may be industrial natural gas consumption.

The at least two geographical characteristics include a number of business establishments associated with each of a plurality of NAICS codes that indicate production activities and a data set of Bureau of Labor Statistics (BLS) data of the number of business establishments, the data set of BLS data including a set of column variables.

Executing the regression further may include using in the regression all of the set of column variables of the dataset of BLS data and the number of business establishments associated with each of the plurality of NAICS codes.

The natural gas consumption may be commercial natural gas consumption.

Implementations of a method of calculating flows of electricity into and out of a geographic area may include for a first time-step: using a processor, attributing each node in a power transform distribution factor (PTDF) to a county of a plurality of counties; using the processor, summing an electrical load and an electrical generation capacity for each node within each county of the plurality of counties (node-level electrical load and node-level electrical generation capacity) to form a county-level electrical load and county-level electrical generation for each county; and using the processor, for each county, dividing each county-level electrical load and county-level electrical generation by a corresponding node-level electrical load and node-level electrical generation capacity for each county to generate a load node-level distribution factor and a generation node-level distribution factor for each county. The method may also include, using the processor, for each node, generating a node-level electrical injection value and a node-level electrical withdrawal value by multiplying the load node-level distribution factor by the county-level electrical load and by multiplying the generation node-level distribution factor by the county-level electrical generation, respectively; using the processor, summing the node-level electrical injection value and the node-level electrical withdrawal value for each node to generate a total injection value and a total withdrawal value for each node; and using the processor, generating a vector of line flows by multiplying the total injection value and total withdrawal value for each node by a transpose of the PTDF. The method may also include using the processor, summing the vector of line flows into each county of the plurality of counties and summing the vector of line flows out of each county of the plurality of counties to generate a county-to-county data set of electrical flows; and repeating for a second time-step.

Implementations of a method of calculating flows of electricity into and out of a geographic area may include one, all, or any of the following:

The first time-step and the second time-step may be one month.

The method may include, using the processor, downscaling the county-to-county data set of electrical flows to a substation-to-substation data set for a plurality of electrical substations included in each county of the plurality of counties.

The method may include, using the processor, downscaling the substation-to-substation data set to a facility-level data set for a plurality of facilities included in each county of the plurality of counties.

The method may include, using the processor, one of upscaling or downscaling the county-to-county dataset of electrical flows to calculate electrical flows associated with a selected geographic area within the plurality of counties.

Implementations of a method of processing data for storage in a commodities flow database may include receiving a training data set of commodity flow data, the training data set including historical time scaled training data at a first time-step from a commodities flow database; and using a plurality of processors included in a high performance computing system operating an analysis module, separately training each artificial neural network of a plurality of artificial neural networks with the training data set. The method may include, using the plurality of processors included in the high performance computing system operating a containerization module, executing grid searches over multiple variables to assess a performance of each artificial neural network with the training data set and selecting a best performing artificial neural network for generating predictive commodities flow data. The method may include, using the plurality of processors included in the high performance computing system operating the containerization module, using new commodity flow data with the best performing artificial neural network to form a predicted commodity flow dataset at a second time-step; and using the plurality of processors included in the high performance computing system, storing the predicted commodity flow dataset in the commodities flow database to configure the commodity flow database to provide commodity flow data to a user at the second time-step.

Implementations of a method of processing data for storage in a commodities flow database may include one, all, or any of the following:

The second time-step may be shorter in time than an existing time-step of historical commodity flow data.

Executing grid searches over multiple variables further may include systematically determining orthogonal combinations of commodity flow variables included in the training data set.

The second time-step may be a future time-step.

The method may include predicting, using the plurality of processors included in the high performance computing system, a flow of a commodity at a specified point in time using the commodities flow database.

Predicting further may include predicting in a future time-step.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 4 is a flow chart of an implementation of a method of calculating county-level commercial natural gas consumption;

FIG. 5 is a flow chart of an implementation of a method of generating a model of county-to-county electrical flows;

DESCRIPTION

Figure 1:
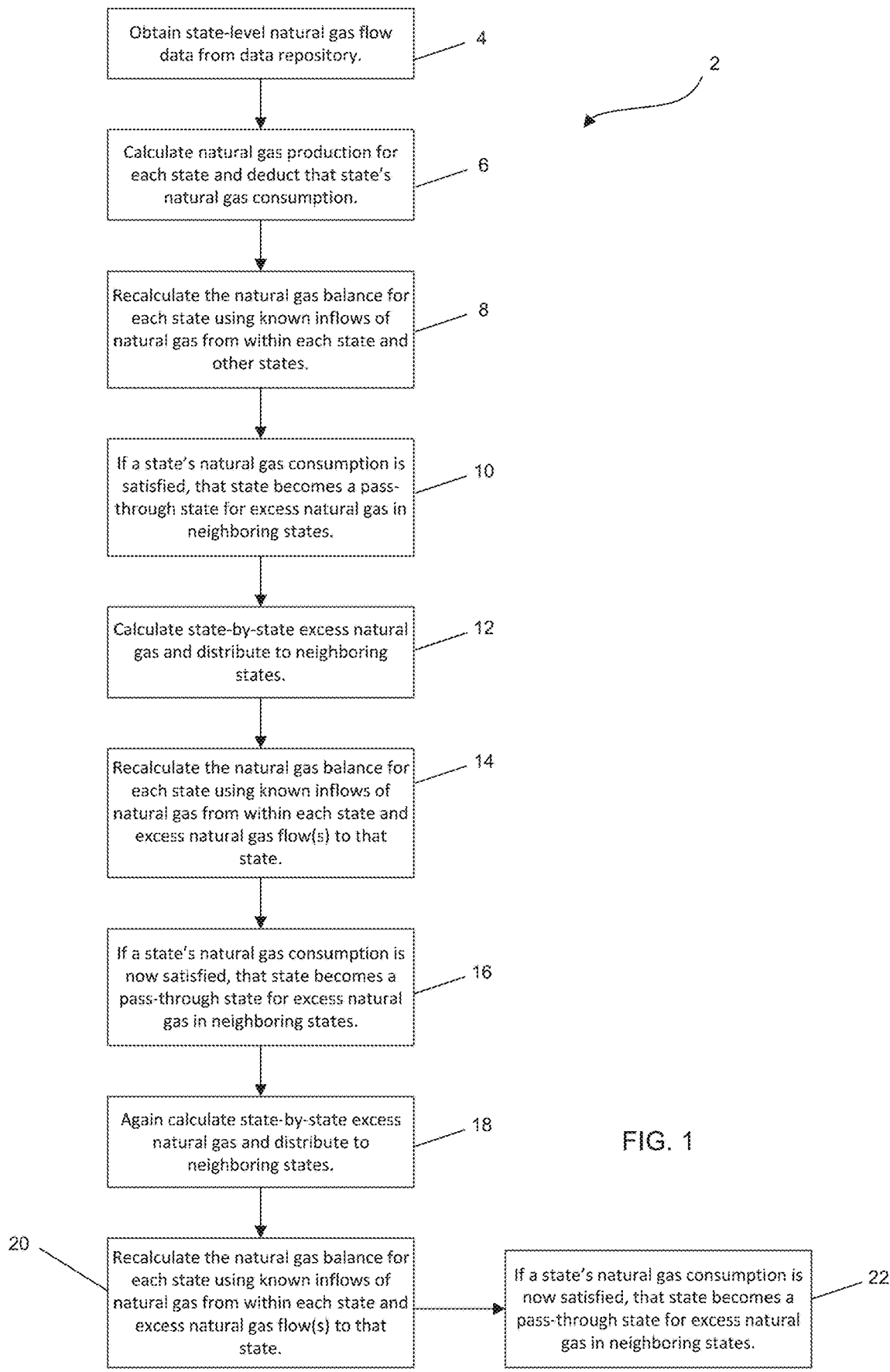
FIG. 1 is a flow chart of an implementation of a method of calculating state-by-state natural gas flows.

This disclosure, its aspects and implementations, are not limited to the specific components, assembly procedures or method elements disclosed herein. Many additional components, assembly procedures and/or method elements known in the art consistent with the intended supply chain data processing and flow modeling will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such supply chain data processing and flow modeling, and implementing components and methods, consistent with the intended operation and methods.

Natural Gas Flows

System and method implementations disclosed herein model natural gas flows involved in production, processing, delivery, receipt, storage, and consumption in the natural gas system throughout the United States based on various open data sources provided by the Energy Information Administrator (EIA). These open data sources form a data repository collectively of natural gas flow data. The EIA data includes state-to-state linkages in the U.S. natural gas system that are dynamically determined by year based on known pipeline capacities between states and sub-state regions. In a particular method implementation, the data for the data repository was obtained from the following: state-to-state pipeline capacity data from EIA US state-to-state capacity file, natural gas production data from the EIA Open Data API, natural gas processing data from the EIA Open Data API, interstate natural gas delivery data from the EIA Open Data API, natural gas consumption data from the EIA Open Data API, and natural gas storage additions and withdrawal data from the EIA Open Data API.

Particular method implementations use the data sources listed above to construct a natural gas balance for each state as the sum of production, receipts, deliveries, storage withdrawals, storage additions, and consumption. States with a positive balance are net contributors to the U.S. natural gas system, and states with negative balances are net consumers to the U.S. natural gas system. Interstate natural gas delivery data establishes the magnitude of flows between states, limited by the capacity between states defined by the state-to-state pipeline capacity data.

Once the state-level data has been obtained from the natural gas data repository, various method implementations include establishing a linear programming model to distribute natural gas production through the state-to-state natural gas network to consumption sectors.

A particular implementation of the method may proceed as follows, implemented using any of the computing resources disclosed in this document. Initially, produced natural gas flows from a state where gas is produced in proportion to the deliveries to all other states. In this first step, natural gas production first satisfies state-level demand before natural gas is distributed to neighboring states through the pipeline network. After the first step, state-level natural gas balances are recalculated using the inflows of natural gas from within the state and other states. If, after the first step, state-level natural gas consumption is satisfied, the state becomes a pass-through state for excess natural gas in neighboring states.

A second step proceeds similarly to the first step but distributes natural gas in excess of consumption to neighboring states rather than distributing natural gas production. After the redistribution of excess natural gas, state-level balances are recalculated. If, after the second step, state-level natural gas consumption is satisfied, the state becomes a pass-through state for excess natural gas in neighboring states.

Figure 9:
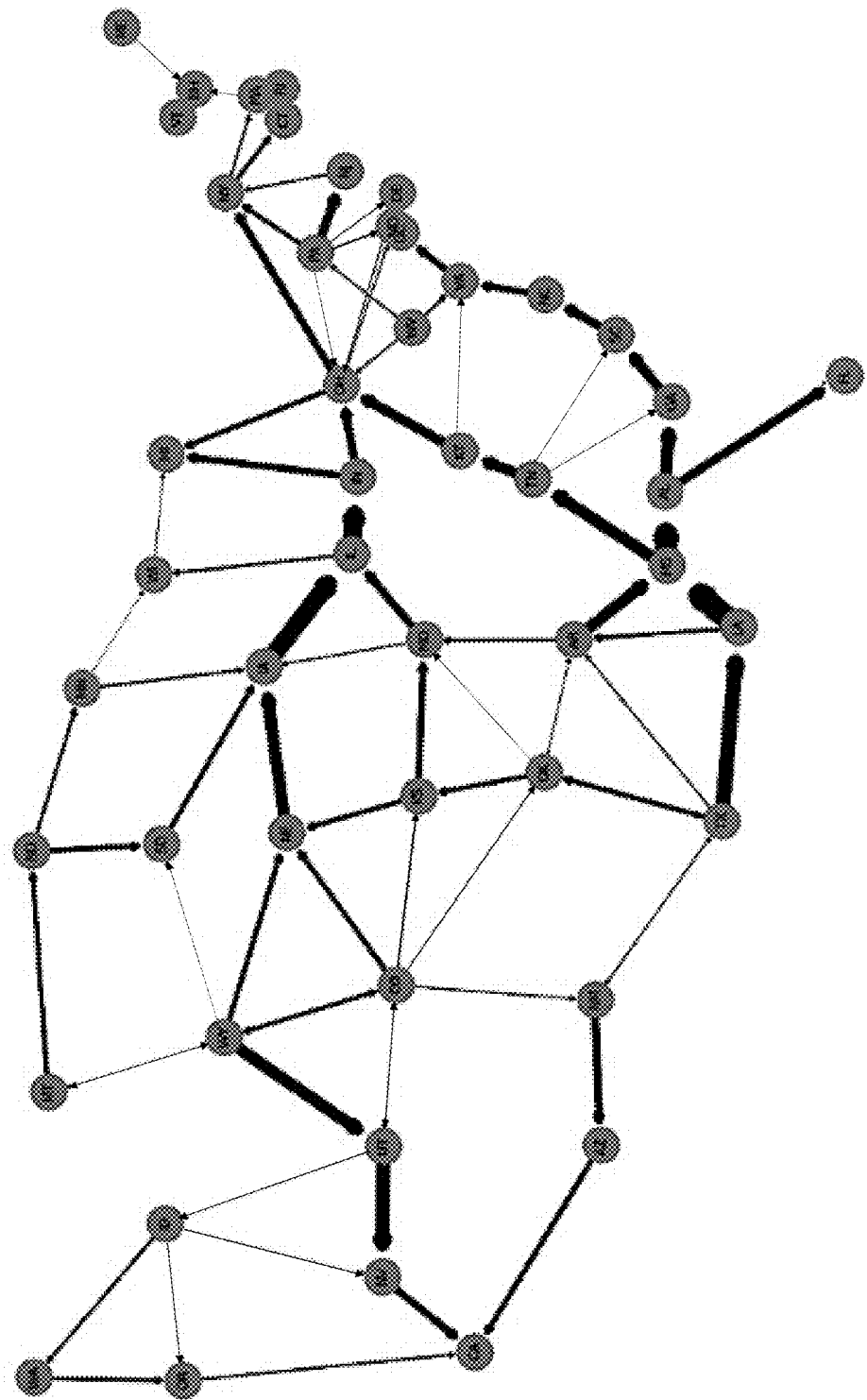
FIG. 9 is a state-level visualization of natural gas flows calculated using an implementation of a method of calculating state-by-state natural gas flows.

The third step proceeds similarly to the second step and this process is repeated until natural gas consumption in each state in the continental United States is satisfied by natural gas production. The method implementation saves two version of the U.S. natural gas system in databases included in the system. First, origin-destination linkages in the U.S. natural gas system are saved in a database and second, flow tracing between origin and destination in the U.S. natural gas system is also saved to the database. FIG. 9 is a visualization of the data of natural gas network calculated by the above method implementation using the system implementation. This diagram illustrates a version of the U.S. natural gas system that shows origin-destination linkages where origins include production and redistribution.

Referring to FIG. 1, a flow chart 2 of another implementation of a method of calculating state-to-state natural gas flows illustrated. While in this implementation, the use of the term "state" as the main geographic descriptor is illustrated, in other method implementations, other geographic areas could also be used, such as, by non-limiting example, country, metropolitan area, census block, region, or any other geographic region where the natural gas data can be upscaled or downscaled to using the method implementation. As illustrated, the method includes obtaining state-level natural gas flow data from a data repository, which may be the EIA, or other natural gas data sources for the particular geographic area being analyzed (step 4). With the data, the method includes calculating natural gas production for each state and deducting each state's natural gas consumption from its production figure (step 6). The method also includes recalculating the natural gas balance for each state using known inflows of natural gas from within each state and other states (step 8). The known inflows may be from the data repository or another data source in various method implementations. The method also includes determining that if a state's natural gas consumption is satisfied at this stage of the method, then the state becomes a pass-through state for excess natural gas in neighboring states (step 10).

The method also include calculating state-by-state excess natural gas and then distributing the excess natural gas to neighboring states (step 12). The method also includes recalculating the natural gas balance for each state using known inflows of natural gas from within each state and excess natural gas flow(s) to that state (step 14). The source of the data for the known inflows may be from the data repository or another data source in various implementations. The method also includes determining that if a state's natural gas consumption is now satisfied, that state becomes a pass-through state for excess natural gas in neighboring states (step 16). The method then includes again calculating state-by-state excess natural gas and distributing the excess natural gas to neighboring states (step 18). The method then includes recalculating the natural gas balance for each state using known inflows of natural gas from within each state and excess natural gas flow(s) to that state (step 20). Again, the data for the known inflows may be derived from the data repository or may be derived from another data source. The method includes determining that if a state's natural gas consumption is now satisfied, that state becomes a pass-through state for excess natural gas in neighboring states (step 22). The processes of steps 18-22 may be repeated an additional one or more times as needed until each state's (or geographic area's) natural gas consumption is satisfied and the state-to-state gas flows have been fully determined throughout the linear programming model.

After the natural gas production is distributed to natural gas consumption through the state-to-state pipeline network, additional method implementations disaggregate end-user consumption to the county-level using various data sources, including U.S. Census population data (including census block data) and data from the Bureau of Labor Statistics Quarterly Census of Employment and Wages (BLS data). The disaggregation methods may be constrained using a fine-scale map of the U.S. natural gas pipeline system to increase output accuracy.

The foregoing have discussed a method of determining and modeling state-to-state flows of natural gas. Where the natural flows into and out of a smaller geographic region (such as, by non-limiting example, a county, group of counties, areas within a county, specific facilities, individual buildings, or any other geographically closed shape) need to be modeled, other methods that consider more localized variables are needed. In this document, three methods are disclosed for calculating the flows of natural gas associated with residential consumption, industrial consumption, and commercial consumption. Each of these is based on a core process that involves providing a geographic level of natural gas production data for a plurality of geographic areas to a database from a data repository. The data repository may be any such data repository of natural gas data disclosed in this document. The geographic area described in the examples in this specification is the county, but the principles disclosed herein could be used to conduct modeling of flows for any geographic area disclosed in this document.

The methods also include the process of removing from the analysis using a process from a computing system (which may be a high performance computing system or cloud computing system like those disclosed herein) all areas of a first county of a the plurality of counties that do not include a natural gas utility. By "natural gas utility" is meant a public or private entity that owns, controls, or utilizes a natural gas distribution pipeline to deliver natural gas to customers. If there is no such utility in a geographic area, it is a reasonable assumption that the natural gas consumption in that area will be minimal or none. The method also includes using a processor, the database, and the county-level natural gas production data to execute a regression with at least two geographical characteristics of the first county to determine the natural gas consumption within the first county. As used herein, a "geographic/geographical characteristic" is a data element that is a feature of an individual, business, institution, facility, building, item manufactured, crop grown, mineral extracted, livestock raised/slaughtered, or other natural or artificial resource physically located within the particular geographic area being analyzed via the regression.

Following the carrying out of the regression, the method includes repeating the analysis for each county of the plurality of counties to determine the natural gas consumption for each of the plurality of counties. In various method implementations, once the natural gas consumption for each of the plurality of counties has been found a county-to-county flow model can be constructed along with corresponding visualizations like any disclosed in this document.

In particular method implementations, disaggregated natural gas production to the county-level using natural gas production data may be obtained from the data sets provided by the USDA Economic Research Service. In various implementations, a multivariate regression approach for disaggregating natural gas consumption and the production disaggregation approach may include aspects of the method taught in the paper to Rushforth et al., "A spatially detailed blue water footprint of the United States economy," *Hydrology and Earth System Sciences*, V. 22, No. 5, p. 3007-3032 (2018), the disclosure of which is hereby incorporated entirely herein by reference. Various method implementations disclosed in this document differ from that used in the Rushforth paper in that instead of using multivariate regression, in some implementations a ridge regression or other Tikhonov regularization approach is utilized. This results in an method where the potential regressors are many and are statistically narrowed using various dynamic algorithm(s) as the regression proceeds (like an elastic net regularization in various implementations). In other method implementations, a "brute force" approach may be used where the regression proceeds by analyzing every available geographic characteristic in a data set in order to be sure to identify all geographic characteristic that affect natural gas consumption within the geographic area. Different methods may be used for residential, industrial, and commercial natural gas consumption modeling; thus the resulting regression equation is different for each area/part of the supply process being disaggregated as a result.

Figure 10:
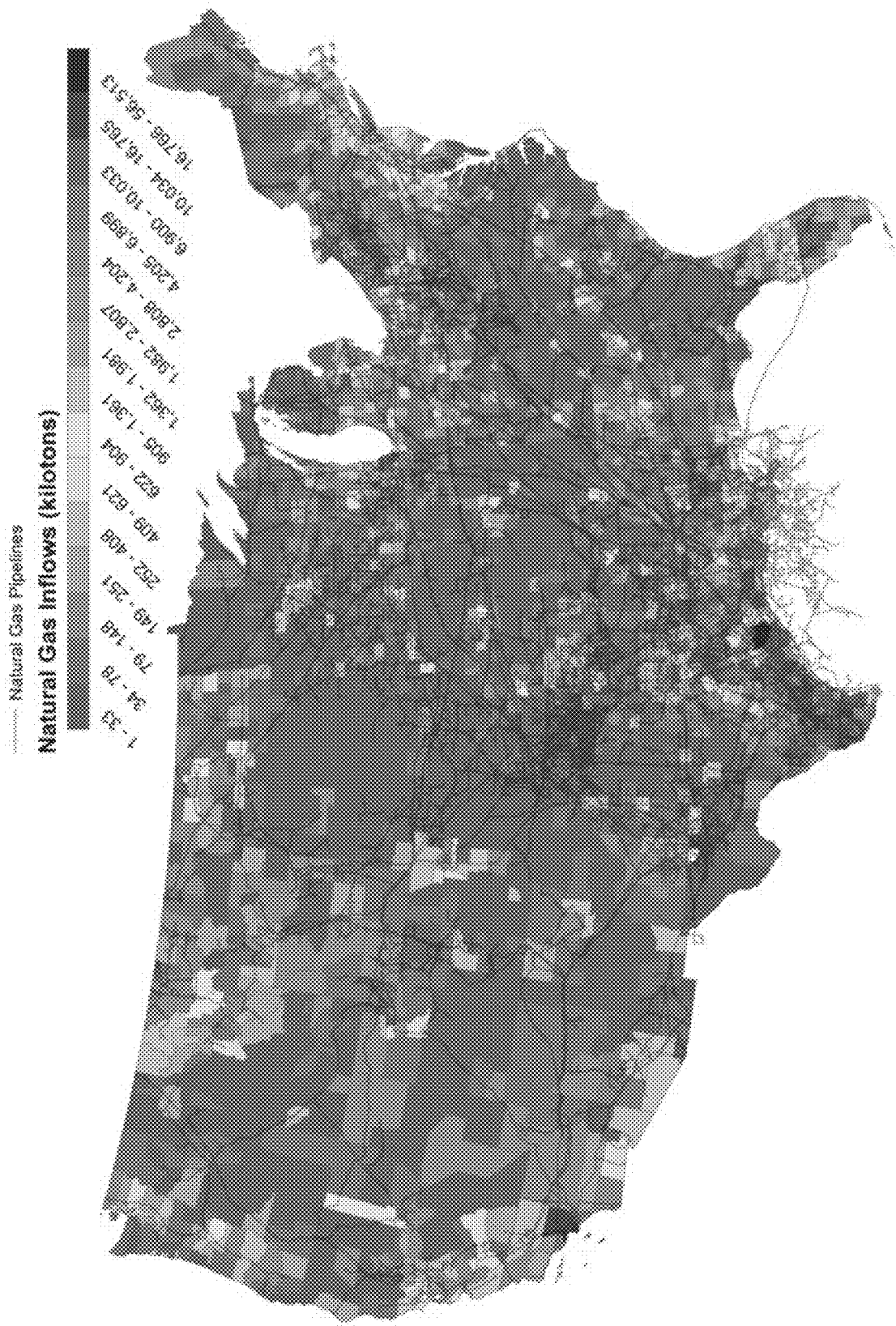
FIG. 10 is a visualization of a county-level downscaling showing natural gas inflows into each county in the continuous United States.

Referring to FIG. 10, a graph of the output from a county-scale downscaling method like those disclosed herein is illustrated showing the inflows of natural gas in kilotons by US county. In this particular implementation, this visualization reflects a summing of the county-to-county natural gas flows associated with all natural gas production in each county along with all residential natural gas consumption, all commercial natural gas consumption, and all industrial natural gas consumption within each county. Many visualizations can be constructed from the county-to-county natural gas flow data that can be generated using the flow modeling methods disclosed in this document.

Figure 2:
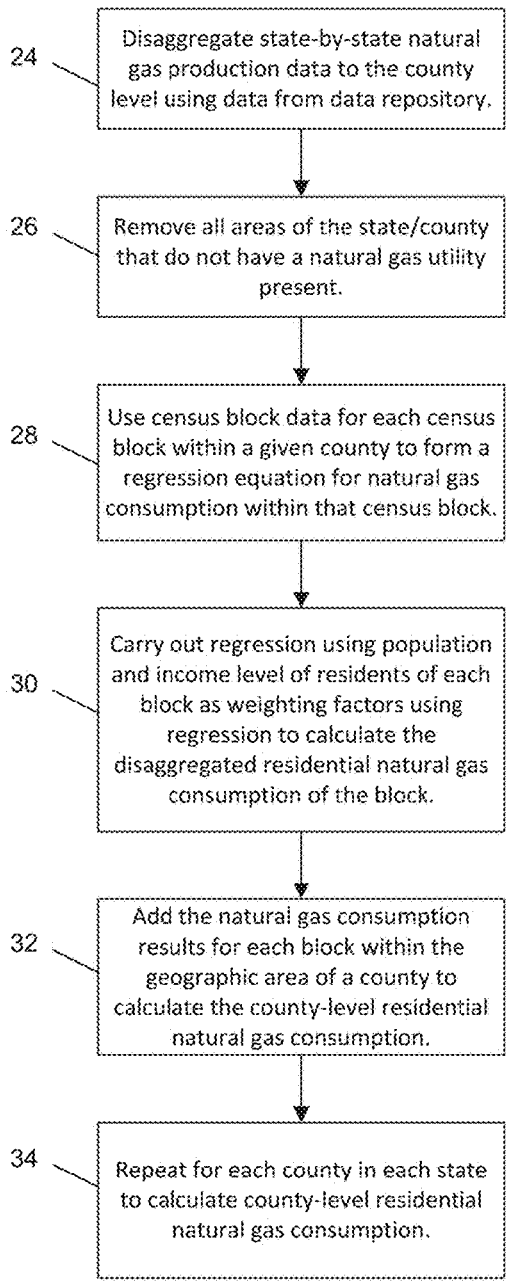
FIG. 2 is a flow chart of an implementation of a method of calculating county-level residential natural gas consumption.

Referring to FIG. 2, an implementation of a method of calculating county-level residential natural gas consumption is illustrated. As illustrated, the method includes disaggregated state-by-state natural gas production data to the county level using data from a data repository like any disclosed in this document (step 24) and removing all areas of the state/county that do not have a natural gas utility present (step 26). The method then uses census block data for each census block within a county being analyzed (first county) to form a regression equation for natural gas consumption within that census block (step 28). The method then includes carrying out regression using the regression equation and the geographic/geographical characteristics of the population of each census block and the income level(s) of the residents of the census block used as weighting factors during regression to calculate a disaggregated residential natural gas consumption for the census block (step 30). This process is repeated for each census block in the first county, and the residential natural gas consumption results for each census block are then added to form the calculated county-level residential natural gas consumption (step 32). This process is then repeated for each county to generate a data set of county-level residential natural gas consumption flows (step 34). The use of population and income level has been noted to correlate with residential natural gas consumption where higher populated census block areas consume more natural gas and residents with more income also consume more natural gas.

Figure 3:
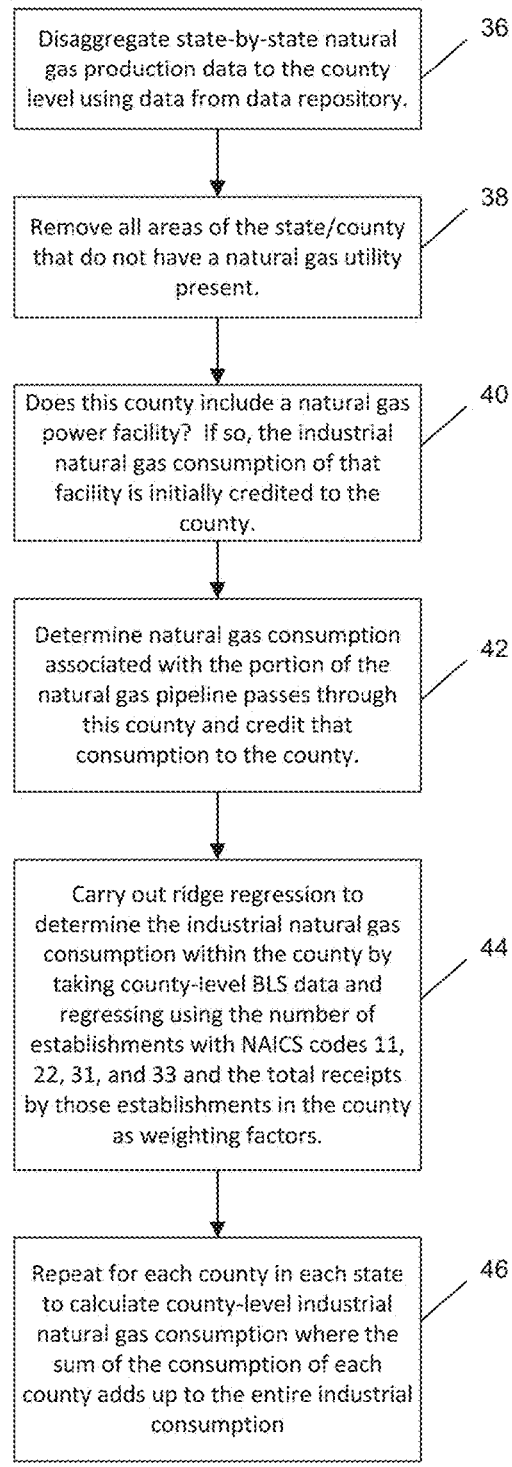
FIG. 3 is a flow chart of a implementation of a method of calculating county-level industrial natural gas consumption.

Referring to FIG. 3, flow chart of an implementation of a method of determining county-level industrial natural gas consumption is illustrated. Like the method illustrated in FIG. 2, the method includes disaggregating state-by-state natural gas production data to the county level using data from a data repository (like any disclosed herein, step 36), and removing all areas of the state/county from the analysis that do not have a natural gas utility present (step 38). The method analysis then continues by determining whether a natural gas electric power facility is included within the county being analyzed (first county). If so, the entire natural gas consumption associated with that facility is credited/accounted to the first county (step 40). The method also includes determining what portion of a natural gas pipeline that passed through the geographic area of the first county and crediting/accounting the natural gas consumption associated with operation of the pipeline to the first county (step 42). The consumption of the pipeline may include both actual consumption and also natural gas losses associated with operations (leaks, maintenance, etc.). The method then includes carrying out a ridge or related regression to determine the industrial natural gas consumption taking place within the first county by using county-level data from the Bureau of Labor Statistics (BLS) to determine, as a geographical characteristic, a number of business establishments within the county associated with North American Industry Classification System (NAICS) codes 11, 22, 31, and 33 (step 44). The method also includes determining as a geographical characteristic the total gross receipts of each of those business establishments within the county. This data may come from the BLS or any other database that contains gross receipts data for the business. The number of business establishments and the gross receipts of each of those business establishments are used as weighting factors in the regression. It has been noted that a higher number of business establishments with these NAICS codes correlates with higher industrial natural gas consumption, as does a business establishment with higher gross receipts. The result of the regression is a county-level industrial natural gas consumption. The method includes repeating this analysis for each county to calculated a county-level industrial natural gas consumption flow (step 46). In various method implementations, an additional step may be added in that the calculated industrial natural gas flows for each county may be checked/verified by adding all of the county-level flows calculated for a state and comparing the summed flow with the known industrial natural gas consumption for the state available from a data repository as a way of testing the accuracy of each county-level regression. Changes to the geographical characteristics used as weighting factors may be carried out as a result of this analysis and the county-level regressions carried out again until the additive state-level regressed numbers align with the state-level data available from the data repository.

Referring to FIG. 4, a flow chart of an implementation of a method of calculating county-level commercial natural gas consumption is illustrated. Like the method implementations illustrated in FIGS. 2 and 3, the method includes disaggregating state-by-state natural gas production data to the county level using data from a data repository (like any disclosed herein, step 48) and removing all areas of the state/county from the analysis that do not have a natural gas utility present (step 50). The method includes, using county-level data from the BLS data set to determine, as a geographical characteristics, the number of commercial establishments with NAICS codes associated with production activities (farming, component manufacturing, restaurants, etc.). The method also includes taking, as a set of geographical characteristics, a data set for the commercial establishments that includes a set of column variables that are each aspects/characteristics of the commercial establishments (step 52). The method then includes using a ridge or related regression to perform a regression using all of the column variables in the BLS data set for the commercial establishments to determine which commercial establishments and their related characteristics correlate with commercial natural gas consumption within the county (step 54). This approach is a "brute force" technique that involves analyzing all of the possible column variables for a correlations. However, in various implementations, only a subset of the column variables may be used through, by non-limiting example, carrying out an initial screening regression, relying on research data regarding commercial natural gas consumption, use of previous regression results in similarly sized/situated/geographically located counties, or any other technique for determining the statistical relevance of a factor. The method includes applying the regressed model with the number of commercial establishments to determine the commercial natural gas consumption for each county (step 56) and then repeating the analysis for each county in the state to calculate county-level commercial natural gas consumption (step 58). As with the method illustrated in FIG. 3, a state-level balance may be employed to check the county-level regressed results by adding up all of the county-level commercial natural gas consumption and verifying the correlation with a state-level commercial natural gas consumption value from a data repository. The analysis may be adjusted and re-executed and additional/other/replacement column variables from the BLS data (or other geographical characteristics) used to improve the regression accuracy to a desired level relative to the state-level consumption data from the data repository.

As previously discussed, once the residential, industrial, and commercial natural gas consumption level has been calculated at the county-level, the county-level values for each can be summed and used to generate a county-level natural gas consumption flow which can be used in combination with the county-level natural gas production flow. A data set of county-level natural gas flows can then be constructed, stored in a commodity flow database, and used in various visualizations.

Electricity Flows

Appendices A and B filed with the '547 application previously incorporated by reference both detail implementations of method of disaggregating flows of electricity to the county-level as well as methods of storing, retrieving, and calculating these flows using a high-performance computing system (Appendix B). Appendix A also includes extensive disclosure on the process of obtaining and calculating historical electrical flow data (load, generation, and capacity) for the time period 1960-2016 for use in calculating county-level time flows at desired time-steps (monthly, yearly, etc.). The method implementations in Appendices A and B establish the historical electrical flow data stored in a data repository that is then used in the various methods disclosed there and in this document to disaggregate the electrical flow data to the county-level (or any other geographic level) at any desired time-step.

Referring to FIG. 5, a flow chart of a method of generating a model of county-to-county electrical flows is illustrated. As illustrated, the method includes estimating electrical load, electrical capacity, and electrical generation at a county-level resolution and at a monthly time-step (step 60). The method also includes generating a power flow model and transforming the county-level electrical load, capacity, and generation data to a node-base input series for use with the model (step 62). The method also includes calculating a set of line-level power flows for each time-step in the time period being considered (step 64) and then aggregating the line-level power flows to the county-level to generate a model of county-to-county electrical flows (inflows and outflows/injections and withdrawals, step 66).

The foregoing method implementation uses as the unit of geographical area the county to generate county-to-county electrical flows, but various method implementations may utilize techniques to downscale or upscale the flow data generated by the method to the substation-level, facility-level, building-level, or any geographical area level desired. In those implementations where the downscaling is done at the building-level, the various method implementations in the paper by New, et al., "Automatic Building Energy model Creation (AutoBEM) for Urban-Scale Energy Modeling and Assessment of Value Propositions for Electric Utilities," *International Conference on Energy Engineering and Smart Grids* Cambridge, UK, (Jun. 25, 2018), the disclosure of which is hereby incorporated entirely herein by reference, may be utilized. Also, the method implementations may utilize the county-level data set published by Oak Ridge National Laboratory entitled "Model America—data and models of every U.S. building," ORNL number 10.13139/ORNLNCCS/1774134, available at https://doi.ccs.ornl.gov/ui/doi/339, published Apr. 14, 2021, a copy of which is filed herewith as Appendix A to this document, the disclosure of which is hereby incorporated entirely herein by reference.

Figure 6:
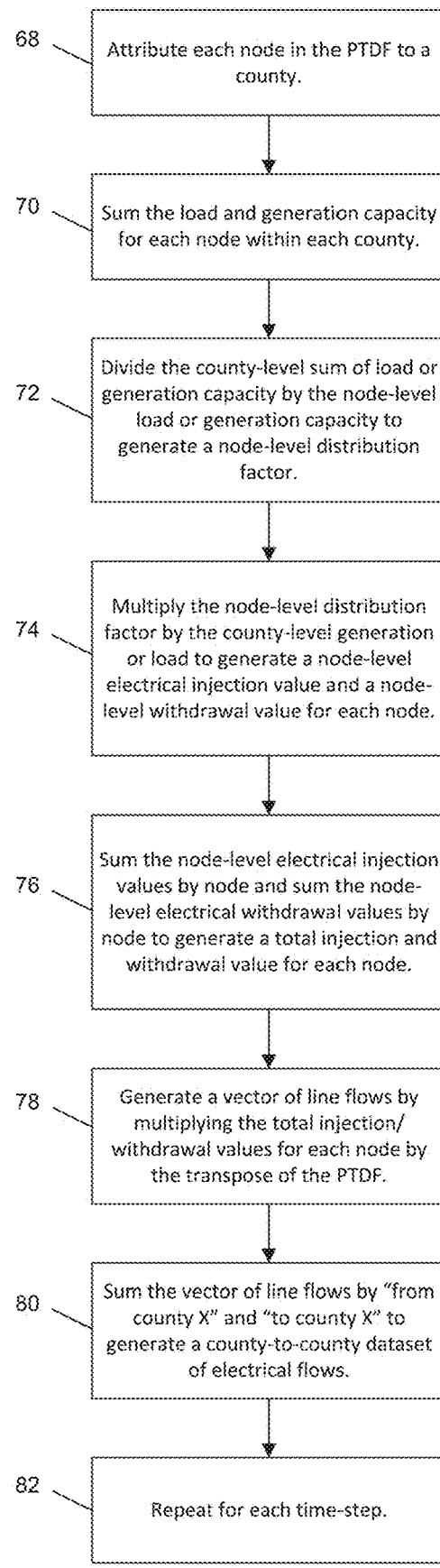
FIG. 6 is a flow chart of an implementation of a method of generating county-to-county data set of electrical flows.

As illustrated in step 60 of FIG. 5, after the estimation of the electrical load, electrical capacity, and electrical generation data at a county-level and at a desired time-step (monthly in this case), the development of a power flow model takes place. Referring to FIG. 6, a flow chart of an implementation of a method of generating such a model to generate a county-to-county data set of electrical flows is illustrated. This method implementations utilizes a Power Transform Distribution Factor (PTDF) matrix. This matrix contains n rows and m columns, where rows represent lines and columns represent nodes. The matrix is sparse, and each matrix entry represents the incremental change in real power flows on a line (row) given an injection at a node (column). The PTDF used in this method implementation is provided by the North American Renewable Integration Study (NA-RIS) at the National Renewable Energy Laboratory. This PTDF is a collection of three power flow cases from the Western Electricity Coordinating Council (WECC), the Eastern Interconnection, and the Electric Reliability Council of Texas (ERCOT). Other PTDFs could be used in various other method implementations, however. The monthly, county-level data is integrated with the PTDF by transforming the input series data (load and generation) to a node-level.

As illustrated in FIG. 6, the method includes attributing each node in the PTDF to a county of a plurality of counties (step 68) the summing the electrical load and electrical generation capacity for each node within each county of the plurality of counties (step 70). These operations, as well as those in this method, may be carried out by one or more processors in any computing system disclosed in this document, including high performance computing systems. The method also includes dividing each county-level sum of electrical load or electrical generation capacity by the corresponding node-level electrical load or node-level electrical generation capacity for each county to generate a load node-level distribution factor and/or a generation node-level distribution factor for each county (step 72). The method then includes multiplying the load node-level distribution factor and/or the generation node-level distribution factor by the corresponding county-level electrical load or county-level electrical generation to generate a node-level electrical injection value and/or a node-level electrical withdrawal value (step 74). The method also includes summing the node-level electrical injection value and the node-level electrical withdrawal value for each node to generate a total injection value and a total withdrawal value for each node (step 76). The method then includes generating a vector of line flows by multiplying the total injection value and total withdrawal value for each node by the transpose of the PTDF (step 78). The method includes summing the vector of line flows into each county of the plurality of counties and summing the vector of line flows out of each county to generate a county-to-county data set of electrical flows (step 80). The method also includes repeating this process for each desired time-step (i.e., repeating each month over a twelve month period to obtain a data set of the county-to-county flows over that twelve month period, step 82).

In particular implementations, the time-step may be one month, but in other implementations the time-step may be longer or shorter. As previously discussed, the geographic unit being analyzed does not have to be a county, but could be at the substation-level, the facility-level, or at the building-level or could be a geographic area larger than a county or a state. This analysis could also be performed at the country level depending on the availability of data.

The various electrical flow modeling techniques disclosed herein could be expanded to other energy flow (and corresponding pollutant flows, like greenhouse gas flow) models. For example, the geographic area could be, by non-limiting example, a footprint associated with an ecological area, a land use area, Human Appropriation of Net Primary Productivity (HANPP), a water use area, a quantity of air pollution emitted, greenhouse gas emissions associated with an energy flow, or any combination thereof. These geographic areas could then be downscaled to the facility or substation or other desired are using the various method implementations disclosed herein and the results used to show both energy flows and associated/corresponding pollutant or other flows. Particular implementations could be used to perform estimation of a facility's or an area's Scope 2 and Scope 3 carbon emission footprints as a way of rolling up all facilities or areas in a geographic region to assign Scope 2 and Scope 3 emissions to a state, county, city, census block, or facility. The ability to determine electricity flows in and out of a given geographic area can be extended to determining other flows that correspond or correlate with the electricity or energy source being modeled including pollution, supply, ecological impact, and many others.

Figure 7:
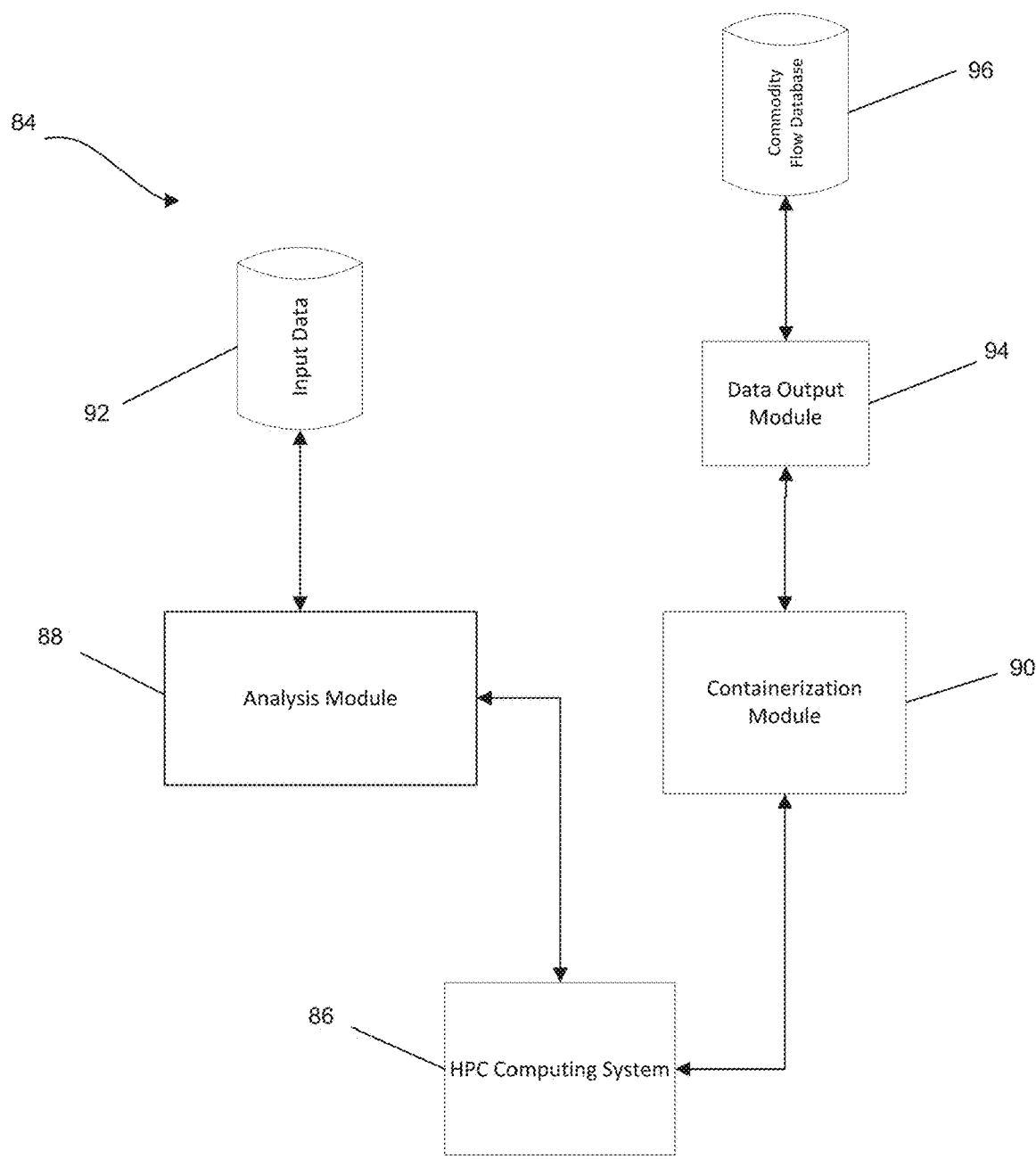
FIG. 7 is a block diagram of a system for assimilating and downscaling commodity flow data.

Commodity Flow Data Processing Systems and Methods:

Referring to FIG. 7, block diagram of an example of a computing system 84 with associated modules that is designed to carry out various methods of processing commodity flow data is illustrated. This computing system could also be utilized to carry out the other various method implementations disclosed in this document and may be modified with additional or other modules as needed to carry out the various operations. As illustrated, a high performance computing (HPC) system 86 is included which includes a plurality of processors operatively coupled with memory and a telecommunications network that is capable of performing large quantity of simultaneous calculations. Such HPC computing systems may include, by non-limiting example, supercomputers, cloud computing systems, graphics processing units, clusters of graphics processing units, or any other computing system capable of arranging multiple simultaneous execution of calculations on a large scale. The HPC system 86 is coupled with a analysis module 88 and containerization module 90 which it may operate itself using its processors or which may be separately operated using other processors associated with a specific computing system designed to operate each module 88, 90. The analysis module 88 carries out various direct data analysis functions of various method implementations including receiving and initially processing data while the containerization module 90 carries out various process flow functions associated with data transformation including, by non-limiting example, downscaling, upscaling, disaggregating, and other data process flow operations. Analysis module 88 receives data for processing from input data database 92 and the output data from the containerization module 90 is received for processing for storage by data output module 94 which then stores the data in commodity flow database 96. A non-limiting example of a commodity flow database may be the database of commodity data marketed under the tradename FEWSION by Northern Arizona University of Flagstaff, Arizona. The containerization module may utilize various containerization systems and methods including, by non-limiting example, those marketed under the tradename DOCKER by Docker, Inc.; those marketed under the tradename KUBERNETES by Cloud Native Computing Foundation; AMAZON ELASTIC CONTAINER SERVICE by Amazon, Inc., or any other containerization or deployment system.

The various method and system implementations disclosed herein may include systems capable of predicting movement and providing real-time or substantially real-time information regarding movement of supply chain commodities in a supply chain through downscaling/predicting/upscaling of supply chain data to desired geographical areas and time-steps. These capabilities are carried out through, by non-limiting example, downscaling coarsely resolved data sets, disambiguating the data sets, and other data processing techniques designed to improve granularity or predictive use.

The ability to collect, store, integrate, increase the granularity of, and display various supply chain data for a wide variety of supply chain commodities (gas, oil, electricity, food, etc.) is disclosed in U.S. Pat. Pub. No. 20200342465 to Ruddell et al., titled "Generating geospatial commodity flow datasets with increased spatial resolution from coarsely-resolved economic datasets," Ser. No. 16/862,252, filed Apr. 29, 2020 and in U.S. Pat. Pub. No. 20200342372 to Ruddell et al., titled "Generation of geospatial images representing disrupted commodity flows between regions for user-defined scenarios specified via a graphical user interface," Ser. No. 16/862,256, filed Apr. 29, 2020, the disclosures of each of which are hereby incorporated entirely herein by reference.

Various authors have considered various modeling techniques for supply chain networks including Gomez et al., "Fragility of a multilayer network of intranational supply chains," Applied Network Science, 5:71, (2020); Oreggioni et al., "A machine learning model of virtual water networks over time," *Advances in Water Resources*, V. 157, 103819 (January 2021); and Garcia et al., "Performance of a multilayer commodity flow network in the United States under disturbance," *COMPLEX NETWORKS* 2019: *Complex networks and their applications VIII*, p. 645-655 (Nov. 25, 2019), the disclosures of each of which are hereby incorporated entirely herein by reference.

Reliance on comprehensive statistically compiled data sets, such as those published by government or private entities to create commodity flow database creates a dataset that is often many years out of date due to long delays in publishing updates to the databases. However, many sources, including governmental and private entities, publish non-comprehensive data updates much more frequently, some even in near-real time. The various system and method implementations disclosed in this document are used to enable the integration, storage, and processing of the updated datasets into a main dataset from which various analyses can be conducted. These are discussed herein in more detail:

A significant challenge to using commodity flow data like FEWSION data, or any data product that employs data fusion from coarsely-resolved statistically compiled data sets like U.S. federal datasets, is that these statistical datasets are published (at best) every quarter and—more commonly—every five years in years ending in 2 or 7 (U.S. Census Bureau, 2019a). In another example, the U.S. Census Commodity Flow Survey is constrained to three global regions (Canada, Mexico, and the Rest of the World). In contrast, the ORNL FAF and FEWSION version 1 are constrained to 8 global regions. However, methodological innovations have allowed for county and city-level supply chain flow. Despite these downsides, significant demand and interest exists in the insight generated from these datasets. This lack of timeliness in the data, however, creates a significant impediment to using these data for real-time, substantially real-time, and anticipatory supply chain decisions. The time resolution and lag vary widely, and since systems like FEWSION ingest many of different datasets, building many pipelines for automatic ingestion when data becomes available is a serious computer science problem. A predictive supply chain data system must overcome data latency and spatio-temporal resolution challenges inherent to these datasets; resolving these technical computing challenges using a streaming data pipeline and data assimilation framework will increase the relevancy of FEWSION data for all kinds of near-real-time and operational prediction and decision applications.

Various system and method implementations like those disclosed herein enable the near-real-time streaming (push) or scraping (pull) pipelines necessary to feed the latest possible data into the commodity flow database using systems like those illustrated in FIG. 7. These systems can achieve operational-time assimilation and re-computation of the data in various implementations. The basic architecture of such a pipeline and data assimilation algorithm is summarized here. Numerous agencies and private companies publish a patchwork of near-real-time data (on lags of seconds to months; months are near-real-time for some purposes; some providers feed future predictions) that have correlations with specific, comprehensive, coarsely-resolved, outdated supply chain data layers captured in baseline commodity flow database products. These include, for example, the Bureau of Labor Statistics (monthly employment and economic data), the Energy Information Administration (monthly electrical transmission, fuel storage), the USA Trade Online data product (monthly trade), and the U.S. Department of Agriculture (monthly drought monitor, cold storage volumes, yields, acreage), state and FHWA/DOT national road and route closure data, national weather service forecasts, USGS temperature, weather, disaster warning, and flooding data, along with private products like those marketed under the tradename FREIGHTWAVES SONAR by FreightWaves, Inc. that tracks freight tender activity across the nation's ports and shipping markets at a near real-time frequency, real time market pricing data, or the travel condition and road status data provided by Google, Inc. One pipeline at a time, these products are scraped and streamed into the input data database 92 of the system 84 of FIG. 7 where they can be used to update and continuously compute the latest possible supply chain data on-demand.

Various system and method implementations disclosed herein may include a systems dynamics model as the use of a Kalman-filter style assimilation may be inappropriate in these implementations. Various implementations employ artificial neural networks and other forms of machine learning to train algorithms relating production, consumption, storage, flow, and/or routing supply chain layers to a set of correlated near-real-time pipelines of predictive data, such that the estimated current state of the supply chain is a function of the most recent outdated baseline layers and the more current data pipelines (e.g. time of year, weather norms). Each artificial neural network is aware of hysteresis-lag or time-lag and may be trained to use the best available time lags and combination of sources data sets for assimilation. The machine learning workflow infers, predicts, and forecasts the production, consumption, storage, and/or movement of domestic commodities, information, services, etc. based on the best available data.

Figure 8:
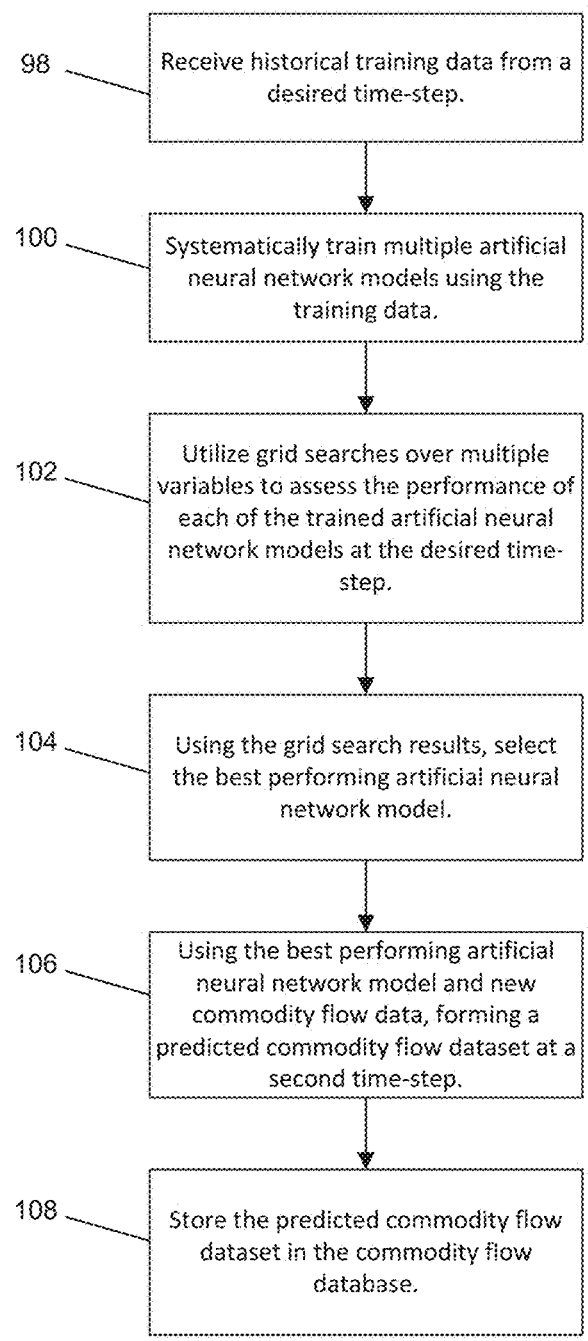
FIG. 8 a flow chart of an implementation of a method of preparing commodity flow data for storage in a commodity flow database.

In various method implementations the training of this algorithm is done using a handful of data pipelines for the near-past 2012 data year in FEWSION version 1 data and will develop high time-frequency (hourly) reanalysis for 2012 to 2019 (FIG. 6). Some system and method implementations may be able to produce an hourly time lag FEWSION data assimilation system where a user can access operational estimates of supply chains that are at most an hour old. FIG. 8 outlines steps involved in implementation of a workflow for use training an artificial neural network and in using the model.

Continuous integration (CI) and continuous deployment (CD) are processes within software development lifecycle that automates the building, testing, and deployment of software in response to code change events. CI/CD, as is commonly abbreviated, also relies heavily on metrics, monitoring, and alerts. The various system implementations disclosed herein utilize combining containers, container orchestration, and CI/CD as a way to do the data processing using the methods disclosed herein.

Referring to FIG. 8, a flowchart of an implementation of a method of preparing commodity flow data for storage in a commodity flow database is illustrated. As illustrated, the method begins by training an artificial neural network by receiving a historical training data set that contains historical time scaled training data at a first (desired) time-step from the commodities flow database (step 98). This data may be stored in the input data database 92 in various implementations. The method then involves systematically separately training each artificial neural network of a plurality of artificial neural networks using the training data set and the HPC computing system 86 (step 100). In various implementations, systematically training may involve serially training each artificial neural network or training each artificial neural network in parallel using the HPC computing system 86.

The method also includes assessing the fit and predictive capability of each artificial neural network to determine which of the set of artificial neural networks has the best predictive ability. In the implementation illustrated in FIG. 8, the method includes executing grid searches over multiple variables to assess the performance of each artificial neural network with the training data set (step 102) and then selecting the best performing network for generating predictive commodities flow data (step 104). In various method implementations, executing grid searches over multiple variables includes systematically determining, orthogonal combinations of the commodity flow variables included in the training data set for each artificial neural network model. Additional fit analysis metrics such as, by non-limiting example, R-squared, adjusted R-squared, Akiaike information criterion (AIC), or any other fit metric(s) appropriate for the particular artificial neural network being employed. In some implementations, elastic nets may be employed to assist with selecting which possible variables to include in the artificial neural network models for training.

With the artificial neural network in place and trained, the method includes using the best performing artificial neural network with new commodity flow data to form a predicted commodity flow dataset at a second time-step (step 106). While the use of new commodity flow data is used in this method implementation, in some method implementations, no new commodity flow data may be used and the artificial neural network may be asked to extrapolate or otherwise predict the flow(s) of a commodity at a future time with no additional constraints/inputs, or with one or more additional constraints/inputs. This activity is carried out using the HPC computing system 86 in combination with the operation of the analysis module 88 and/or containerization module 90 and the predicted commodity flow dataset is output to the data output module 94. Following the generation of the predicted commodity flow dataset, the method includes storing the predicted commodity flow data set in the commodity flow database 96 using the data output module 94 (step 108).

The foregoing method implementation focuses on training an artificial neural network model best adapted for generating predictive commodity flow data for a given commodity based on historical data. In other method implementations, the use of additional near-real time data with the artificial neural network model may be used to generate the predictive data or real-time data. In various method implementations, the model may also be used to perform retrospective analysis to a time-step in the past where historical data is unavailable. Such retrospective analysis is also predictive, but not in the future.

Various method implementations may also utilize the trained artificial neural network to be able to generate historical or future downscaled data on the basis of geographic area or time-scale using the input of recent or historical commodity flow data. To achieve the best results, the training of the artificial neural networks may be done specifically to achieve the specific type of downscaling desired (geographic, time-scale, or both). Additional models may also be used in combination with the trained artificial neural network to achieve downscaling to specific levels (i.e., the building-level models previously discussed in this document). Upscaling may also be conducted using the trained artificial neural network models both in geography and/or in time-scale in a similar way. The artificial neural network may also be used to predict a flow of a commodity at a specified point in time in a supply chain.

In places where the description above refers to particular implementations of supply chain data processing and flow modeling and implementing components, sub-components, methods and sub-methods, it should be readily apparent that a number of modifications may be made without departing from the spirit thereof and that these implementations, implementing components, sub-components, methods and sub-methods may be applied to other supply chain data processing and flow modeling systems and methods.

What is claimed is:

1. A method of calculating flows of electricity into and out of a geographic area, the method comprising:
    for a first time-step:
        using a processor, attributing each node in a power transform distribution factor (PTDF) to a county of a plurality of counties;
        using the processor, summing an electrical load and an electrical generation capacity for each node within each county of the plurality of counties (node-level electrical load and node-level electrical generation capacity) to form a county-level electrical load and county-level electrical generation for each county;
        using the processor, for each county, dividing each county-level electrical load and county-level electrical generation by a corresponding node-level electrical load and node-level electrical generation capacity for each county to generate a load node-level distribution factor and a generation node-level distribution factor for each county;
        using the processor, for each node, generating a node-level electrical injection value and a node-level electrical withdrawal value by multiplying the load node-level distribution factor by the county-level electrical load and by multiplying the generation node-level distribution factor by the county-level electrical generation, respectively;
        using the processor, summing the node-level electrical injection value and the node-level electrical withdrawal value for each node to generate a total injection value and a total withdrawal value for each node;
        using the processor, generate a vector of line flows by multiplying the total injection value and total withdrawal value for each node by a transpose of the PTDF; and
        using the processor, summing the vector of line flows into each county of the plurality of counties and summing the vector of line flows out of each county of the plurality of counties to generate a county-to-county data set of electrical flows; and
    repeating for a second time-step.

2. The method of claim 1, wherein the first time-step and the second time-step are one month.

3. The method of claim 1, further comprising, using the processor, downscaling the county-to-county data set of electrical flows to a substation-to-substation data set for a plurality of electrical substations comprised in each county of the plurality of counties.

4. The method of claim 3, further comprising, using the processor, downscaling the substation-to-substation data set to a facility-level data set for a plurality of facilities comprised in each county of the plurality of counties.

5. The method of claim 1, further comprising, using the processor, one of upscaling or downscaling the county-to-county dataset of electrical flows to calculate electrical flows associated with a selected geographic area within the plurality of counties.

6. A system for calculating flows of electricity into and out of a geographic area, the system comprising:
a processor configured to:
for a first time-step:
attribute each node in a power transform distribution factor (PTDF) to a county of a plurality of counties;
sum an electrical load and an electrical generation capacity for each node within each county of the plurality of counties (node-level electrical load and node-level electrical generation capacity) to form a county-level electrical load and county-level electrical generation for each county;
for each county, divide each county-level electrical load and county-level electrical generation by a corresponding node-level electrical load and node-level electrical generation capacity for each county to generate a load node-level distribution factor and a generation node-level distribution factor for each county;
for each node, generate a node-level electrical injection value and a node-level electrical withdrawal value by multiplying the load node-level distribution factor by the county-level electrical load and by multiplying the generation node-level distribution factor by the county-level electrical generation, respectively;
sum the node-level electrical injection value and the node-level electrical withdrawal value for each node to generate a total injection value and a total withdrawal value for each node;
generate a vector of line flows by multiplying the total injection value and total withdrawal value for each node by a transpose of the PTDF; and
sum the vector of line flows into each county of the plurality of counties and sum the vector of line flows out of each county of the plurality of counties to generate a county-to-county data set of electrical flows; and
repeat for a second time-step.

7. The system of claim 6, wherein the first time-step and the second time-step are one month.

8. The system of claim 6, further comprising wherein the processor is further configured to downscale the county-to-county data set of electrical flows to a substation-to-substation data set for a plurality of electrical substations comprised in each county of the plurality of counties.

9. The system of claim 8, further comprising wherein the processor is further configured to downscale the substation-to-substation data set to a facility-level data set for a plurality of facilities comprised in each county of the plurality of counties.

10. The system of claim 6, further comprising wherein the processor is configured to one of upscale or downscale the county-to-county dataset of electrical flows to calculate electrical flows associated with a selected geographic area within the plurality of counties.

11. A system for calculating flows of electricity into and out of a geographic area, the system comprising:
memory including machine-readable instructions; and
one or more processors configured, in response to executing the machine-readable instructions to perform operations comprising:
for a first time-step:
attribute each node in a power transform distribution factor (PTDF) to a county of a plurality of counties;
sum an electrical load and an electrical generation capacity for each node within each county of the plurality of counties (node-level electrical load and node-level electrical generation capacity) to form a county-level electrical load and county-level electrical generation for each county;
for each county, divide each county-level electrical load and county-level electrical generation by a corresponding node-level electrical load and node-level electrical generation capacity for each county to generate a load node-level distribution factor and a generation node-level distribution factor for each county;
for each node, generate a node-level electrical injection value and a node-level electrical withdrawal value by multiplying the load node-level distribution factor by the county-level electrical load and by multiplying the generation node-level distribution factor by the county-level electrical generation, respectively;
sum the node-level electrical injection value and the node-level electrical withdrawal value for each node to generate a total injection value and a total withdrawal value for each node;
generate a vector of line flows by multiplying the total injection value and total withdrawal value for each node by a transpose of the PTDF; and
sum the vector of line flows into each county of the plurality of counties and sum the vector of line flows out of each county of the plurality of counties to generate a county-to-county data set of electrical flows; and
repeat for a second time-step.

12. The system of claim 11, wherein the first time-step and the second time-step are one month.

13. The system of claim 11, further comprising wherein the one or more processors are further configured in response to executing the machine-readable instructions to downscale the county-to-county data set of electrical flows to a substation-to-substation data set for a plurality of electrical substations comprised in each county of the plurality of counties.

14. The system of claim 13, further comprising wherein the one or more processors are further configured in response to executing the machine-readable instructions to downscale the substation-to-substation data set to a facility-level data set for a plurality of facilities comprised in each county of the plurality of counties.

15. The system of claim 11, further comprising wherein the one or more processors are further configured in response to executing the machine-readable instructions to one of upscale or downscale the county-to-county dataset of electrical flows to calculate electrical flows associated with a selected geographic area within the plurality of counties.

\* \* \* \* \*